ns"; CHE 920, Sep. 1985.

United States Patent [19]
Gibson et al.

[11] Patent Number: 4,802,186
[45] Date of Patent: Jan. 31, 1989

[54] HIGH REFLECTANCE LASER RESONATOR CAVITY

[75] Inventors: James O. Gibson, El Segundo; Victor C. Gearhart, Torrance; Steven E. Birrell, Lancaster; Gabriele M. Hawrylow, Sebastopol, all of Calif.

[73] Assignee: Hughes Aircraft Company, Los Angeles, Calif.

[21] Appl. No.: 69,802

[22] Filed: Jul. 6, 1987

[51] Int. Cl.$^4$ .............................................. H01S 3/08
[52] U.S. Cl. ............................................ 372/92; 372/33
[58] Field of Search ..................... 372/69, 72, 61, 33, 372/65, 92, 99; 252/301 T

[56] References Cited
U.S. PATENT DOCUMENTS

| | | | |
|---|---|---|---|
| 3,979,696 | 9/1976 | Buchman | 372/70 |
| 4,032,862 | 6/1977 | Huchital et al. | 372/70 |
| 4,096,450 | 6/1978 | Hill et al. | 372/34 |

OTHER PUBLICATIONS

Alcoa Chemicals Div.; "Product Data Calcined Aluminas"; CHE 920, Sep. 1985.

Primary Examiner—Léon Scott, Jr.
Attorney, Agent, or Firm—M. E. Lachman; A. W. Karambelas

[57] ABSTRACT

A ceramic pump cavity structure for use in solid state lasers wherein the pump cavity comprises sintered alumina having grain sizes of between about 0.3 to 0.5 microns. Sintered alumina pump cavities having grain sizes within this range provide desirable diffuse reflectivity comparable to barium sulfate while at the same time providing a structurally strong cavity which is resistant to cracking and breakage. Combinations of the alumina pump cavity with parasitic light absorbers such as samarium oxide are also disclosed.

13 Claims, 1 Drawing Sheet

HIGH REFLECTANCE LASER RESONATOR CAVITY

BACKGROUND OF THE INVENTION

1. Field of the Invention

The present invention relates generally to lasers and more particularly to an improved ceramic structure for use as the pumping cavity in flash lamp pumped, solid state lasers.

2. Description of Related Art

When certain high gain laser materials such as neodymium-doped yttrium aluminum garnet (Nd:YAG) or neodymium-doped gadolinium scandium gallium garnet (Nd:GSGG) are pumped to a condition of large population inversion, for example in order to achieve Q-switching, a saturation effect occurs which limits the laser output energy obtainable regardless of the level of input pumping energy. This saturation is caused in part by a laser depumping phenomenon resulting from the fact that a significant amount of fluorescent radiation at the lasing wavelength escapes laterally from the laser rod into the surrounding pumping cavity and is reflected by the pumping cavity back into the laser rod. This return radiation stimulates decay from the upper laser transition level, thereby effectively limiting the number of excited ions which can occupy that level and, in turn, limiting the maximum output energy obtainable from the laser.

In order to overcome the above problems, solid state lasers are typically constructed so that both the laser rod and the pumping flash lamp are housing within a samarium-doped glass tube. The samarium-doped glass provides absorption of radiation at the lasing wavelength (1.06 microns) while providing transmission of the pumping radiation.

The samarium-doped glass tube is surrounded with a material having a high diffuse reflectivity to achieve uniform illumination of the surface of the laser rod by the pumping radiation. The material typically used to provide the desired high diffuse reflectivity is barium sulfate. When barium sulfate powder is used, it is usually tightly packed between the samarium-doped tube and an outer concentric aluminum tube. Alternatively, the barium sulfate powder is mixed with conventional plasticizers and binders and sintered to form a ceramic body used to surround the doped samarium glass tube. These ceramic bodies are generally referred to as pump cavity bodies or simply pump cavities.

U.S. Pat. No. 3,979,696 discloses a Nd:YAG pump cavity in which a fused quartz or borosilicate glass tube is coated with a polycrystalline powder, such as samarium oxide. The samarium oxide coated tube provides the same desirable adsorption as the samarium-doped glass tube, and is much less expensive. The contents of this patent are hereby incorporated by reference.

Although the above-described pump cavities have been found to be suitable for their intended purpose, there has been a continuing need to develop new materials having high diffuse reflectivity to replace the conventionally used barium sulfate. Although barium sulfate provides excellent diffuse reflectivity, it is an inherently weak material which has a flexural strength of only 600 pounds per square inch (40.83 atmospheres). Pump cavity bodies which utilize barium sulfate also tend to be expensive to make, are dusty thereby contaminating the optics and are easily broken or cracked.

Accordingly, there is presently a need to provide new materials to replace barium sulfate as the diffuse reflector material, particularly in Nd:YAG laser pump cavities. The new material should provide a high level of diffuse reflection which is comparable to barium sulfate while at the same time being easily molded or otherwise shaped and sintered to form a strong pump cavity body which is dust free and is resistant to breakage and fracture.

SUMMARY OF THE INVENTION

In accordance with the present invention a new material has been discovered for use as the diffuse reflector material in solid state laser pump cavities. The new material provides diffuse reflection which is comparable to barium sulfate, while at the same time being much more resistant to breakage and fracture, and is dust free.

The present invention is based on the discovery that powdered alumina can be molded and sintered to produce a structurally strong pump cavity body which provides diffuse reflectivity of the lasing wavelength of selected laser materials such as Nd:YAG, which is close or equivalent to barium sulfate.

Powdered alumina has been widely used to form many different types of ceramic articles. Typically, the powdered alumina is mixed with various plasticizers and/or binders and formed by injection molding or other conventional techniques into the desired shape. The shaped article is then sintered at an elevated temperature of between 1600° C. to 1700° C. Sintering or firing at such high temperatures produces alumina ceramic bodies which have relatively large grain sizes, are very dense, and which are extremely strong. In accordance with the present invention, alumina powder is sintered at temperatures of 1300° C. to 1425° C. to produce ceramic bodies having relatively small grain sizes of between about 0.3 to 0.5 microns. It was discovered that these ceramic bodies when shaped as laser pump cavities provide diffuse reflectivity comparable to barium sulfate while at the same time providing increased structural strength As an additional feature of the present invention, the sintered alumina pump cavity is coated with a frit containing samarium oxide to form a glaze to provide for absorption of the lasing wavelength to reduce depumping of the laser due to return radiation.

The above-discussed and many other features and attendant advantages of the present invention will be become apparent as the invention becomes better understood by reference to the following detailed description when considered in conjunction with the accompanying drawings.

DESCRIPTION OF THE PREFERRED EMBODIMENTS

Figure 1:
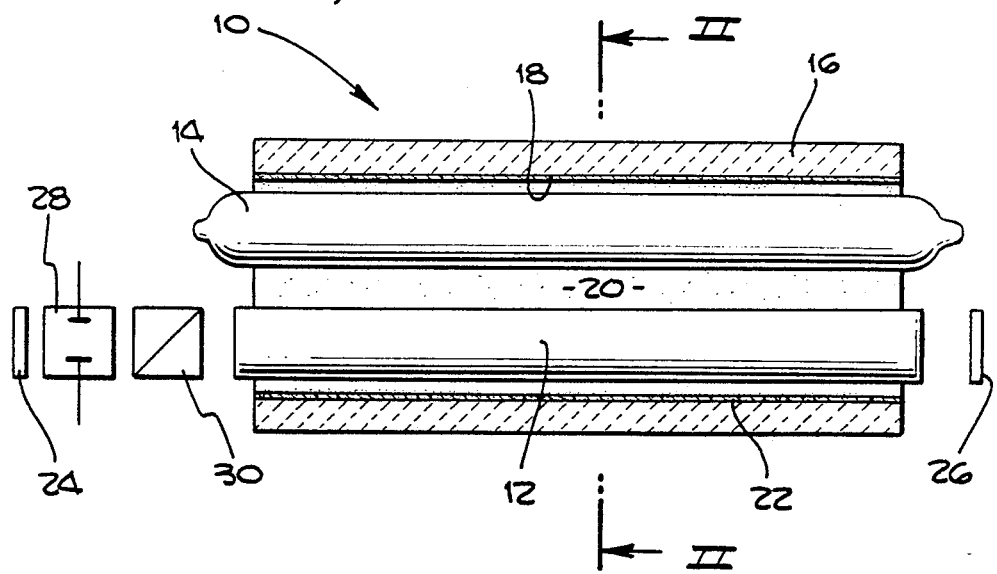
FIG. 1 is a partial side sectional view of a laser pumping device in accordance with the present invention.
Figure 2:
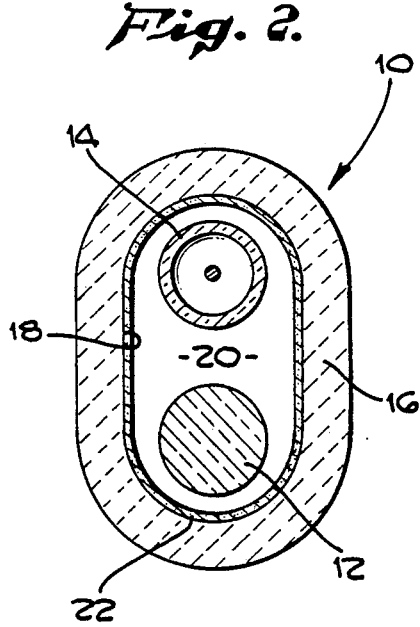
FIG. 2 is a sectional view of FIG. 1 taken in the II—II plane.

An exemplary laser pumping device in accordance with the present invention is shown generally at 10 in FIGS. 1 and 2. The device 10 includes a rod 12 of laser material and a pumping flash lamp 14. The laser material comprises Nd:YAG or Nd:GSGG or other lasing material having pump bands within the range of 0.4 to 2.0 micrometers. The rod 12 and flash lamp 14 are mounted inside of sintered alumina body 16. The alumina body 16 includes an interior surface 18 which defines the pump cavity 20 in which the laser rod 12 and pump flash lamp 14 are housed. Preferably, the alumina body 16 will include a coating of samarium oxide glaze 22 in order to provide desired absorption of parasitic wavelengths around 1.06 microns.

The flash lamp 14 emits pumping radiation which excites the material of the rod 12 to a condition in which population inversion is established between a pair of energy levels of the laser material. As a result, laser radiation is emitted from the ends of laser rod 12 at a wavelength corresponding to the energy difference between the pair of energy levels in question. As an example, when the laser rod 12 is made of Nd:YAG or Nd:GSGG, the desired pumping radiation may be provided by a xenon flash lamp 1 4, creating laser emission at wavelengths of approximately 1.06 microns due to laser transitions between the $^4F_{3/2}$ and $^4F_{11/2}$ energy states of neodymium.

A pair of aligned reflectors 24 and 26 are disposed adjacent opposite ends of laser rod 12 to provide an optical resonator for reflecting emitted laser radiation back into the rod 12 in regenerative fashion. Q-switching operation may be achieved by locating conventional Q-switching elements between an end of the rod 12 and one of the reflectors, such as reflector 24. The Q-switching elements may include an electro-optic device 28, such as a Kerr cell or a Pockels cell and a polarizer 30, such as a Nicol polarizer or a Glan-Thomson prism. The above-described laser elements are all conventional and well-known except for the ceramic structure in accordance with the present invention which is composed of the sintered alumina body 16 and the samarium glaze 22. The details of this ceramic structure will be described below, with it being understood that the ceramic structure may be utilized in a wide variety of laser devices other than the specific exemplary embodiment described above.

The sintered alumina body 16 can be made according to any number of conventional sintering procedures so long as the final ceramic body 16 has grain sizes of between about 0.3 to 0.5 microns. The optimum grain size is a function of the wavelength of the radiation being pumped, and can be adjusted accordingly to obtain the optimum diffuse reflectance, and strength. For a pump band of 0.4 to 2 micrometers, grain sizes between about 0.3 to 0.5 microns are optimum. Preferably, the required grain size is achieved by mixing alumina powder with appropriate binders and at least one plasticizer to form a thermosetting mixture which can be molded according to conventional procedures to form a "green" body having the desired tubular shapes shown in FIGS. 1 and 2. Standard injection molding machines can be used as well as conventional molding techniques. It is important that the initial alumina powder have particle sizes below about 0.6 microns. Preferably, the alumina powder should have particle sizes in the range of from about 0.28 to 0.50 microns. The alumina powder can be any of the commercially available powders which have particle sizes in the desired range and which are preferably at least 99.9 percent by weight pure. Suitable commercially available powders include those available from the Aluminum Company of America (ALCOA), such as grade A-16SG. Grade A-16SG is a preferred material. Other commercially available alumina powders can also be used such as ALUMALUX 39 which is also available from ALCOA.

The alumina powder is preferably mixed with two or more binders and at least one plasticizer. The binders are preferably thermosetting below 200° C. Sufficient binders and plasticizers are added so that the mixture is 70 percent to 90 percent solids and very fluid (low viscosity) at a temperature of about 200° C. to 350° C. As is conventional, the hot alumina slurry is injected into an appropriately shaped die at this temperature and at pressures ranging from 30 psi (2.04 atmospheres) to 15,000 psi (1020.7 atmospheres). The fluid or slurry is allowed to cool within the die and becomes a solid at temperatures ranging from 100° C to 200° C. The formed part is then ejected from the die.

The above-described basic alumina molding procedure allows reproduction of parts with extremely complex geometry if desired. Standard injection molding machines can be used if desired. Suitable binders include those conventional binders used in the molding of alumina such as polyethylene binders and polyvinyl alcohol binders. Plasticizers which may be used also include any of the conventional plasticizers such as stearic acid. The amount and number of binders and plasticizers utilized may be varied so long as the injection mixture is from 70 percent to 90 percent by weight solids and is very fluid (i.e. low viscosity) at temperatures of between 200° C. to 350° C. Further, the plasticizers and binders must be present in sufficient quantities to provide as near to perfect replication of the die cavity as possible during molding and also hold the molded alumina article together during sintering.

Typically, the molded alumina body is subjected to either liquid phase or gas phase extraction prior to sintering in order to remove the plasticizers. Only one binder is allowed to remain in the molded alumina body in order to provide the necessary adhesion and structural integrity during the sintering or firing process. The sintering or firing of the molded alumina body is preferably conducted at atmospheric pressure and in an air atmosphere. Other firing pressures and atmospheres are possible as is well known for conventional techniques of firing alumina.

In accordance with the present invention, the firing temperature for the alumina body is between 1300° C. and 1425° C. and preferably about 1400° C. The duration of firing will be from one to four hours with preferred firing or sintering times being between about 0.8 to 1.2 hours. The sintering temperature and time is varied to provide a final sintered alumina body having grain sizes of between about 0.3 to 0.5 microns, which provides maximum diffuse reflectance. Grain sizes of about 0.45 microns are preferred. It is also preferred that the firing temperature be kept close to 1400° C. in order to reduce the time necessary for formation of the ceramic body. The desired grain size range can be verified by scanning electron microscopy or other suitable technique.

The packing density for the final sintered alumina body should be between about 70 to 87 percent. The preferred packing density is about 85 percent.

Grain growth inhibitors may be used during the sintering process. Many of the commercially available alumina powders include conventional grain growth inhibitors such as magnesium oxide. The amount of grain growth inhibitor present in the alumina is preferably less than 2,000 parts per million (ppm). Alumina powder such as ALCOA Grade 16G has about 200 ppm magnesium oxide and can be suitably used in forming alumina bodies in accordance with the present invention. The amount of grain growth inhibitor is not particularly critical so long as the firing temperatures and times are adjusted accordingly so that the final grain sizes of the sintered alumina body is between about 0.3 to 0.5 microns.

Other conventional procedures may be utilized to form the alumina pump cavities so long as the final product includes grain sizes as set forth above. For example, the alumina can be cold pressed at high pressures (i.e. around 5,000 psi) to form an alumina ceramic body having the desired grain size, packing density, diffuse reflectivity and strength. Typically, cold press procedures involve mixing the alumina with a suitable binder such as a three percent solution of paraffin wax in trichloroethane. The cold press formation of alumina bodies is conventional and any of the well-known techniques may be utilized provided that the desired criteria with regard to grain size and packing density are achieved as described above.

As previously mentioned, it is preferred that a glaze of samarium oxide 18 be applied to the interior surface 22 of the alumina pump cavity 16. The samarium oxide glaze is preferably from 1 thousandths of an inch (0.025 millimeter) to 5 thousandths of an inch (0.127 millimeter) thick. The samarium oxide glaze is preferably applied in the form of a frit which is then fired at temperatures of about 1300° C. to form the transparent glass or glaze layer. The composition of the frit (powdered glass) which has provided efficient absorption of 1.06 microns radiation is provided in the following table:

| Oxide | Weight % (w/o) |
|---|---|
| $Li_2O$ | 4.15 |
| $Al_2O_3$ | 14.16 |
| $SiO_2$ | 33.38 |
| $B_2O_3$ | 9.68 |
| SrO | 14.40 |
| $Sm_2O_3$ | 24.22 |

The frit is "painted" onto the $Al_2O_3$ pump cavity as a paint or paste. The paste uses a fugitive binder like NICROBRAZ cement (8 w/o polyethylmethacrylate in 1,1,1-trichloroethane). The frit is melted onto the $Al_2O_3$ structure at 1300° C., forming a smooth transparent glaze.

Techniques for applying a layer of an oxide glaze or glass frit to ceramic materials are well known. Preferably, the samarium frit is mixed with any of the commercially available cements to form the paste or suspension which is applied by spraying, or other suitable application to the entire surface of the alumina body. Typical commercial cements include an 8 percent by weight solution of polyethyl methacrylate in 1'1'1'-trichloroethylene. It is preferred that the entire sintered aluminum oxide structure be covered with glaze because this increases the strength of the material and in addition keeps the body clean during handling and use.

Figure 3:
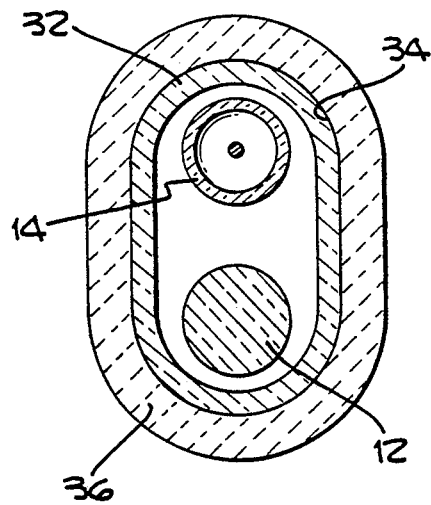
FIG. 3 is a sectional view of an alternative preferred exemplary embodiment in accordance with the present invention.

An alternative embodiment of the present invention is shown in FIG. 3. In this embodiment, a samarium-doped glass lining 32 is provided on the interior surface 34 of the alumina pump cavity 36. Samarium-doped glass is widely used in Nd:YAG lasers and can also be utilized in conjunction with the sintered alumina pump cavity body of the present invention. A samarium oxide coated glass tube according to U.S. Pat. No. 3,979,696 may also be used.

The improved reflectance achieved by a structure formed in accordance with the present invention is shown in Table I. The reflectance values in Table I are direct readings from an integrating sphere spectrophotometer with a 1.25% correction for diffuse reflectance. As indicated in item 4 of Table I, a structure in accordance with the present invention formed from ALCOA 16SG grade aluminum oxide, by injection molding and sintered at 1400° C. for 1 hour to produce an average particle size of about 0.45 micrometers, had a reflectance of 96.8%. This value compares very favorably with the 97% reflectance obtained from a structure of barium sulfate (item 1 of Table I), which is the accepted standard for reflectance. By contrast, aluminum oxide structures formed by prior art methods had reflectances of 94.0% and 94.3%, as shown in items 2 and 3 of Table I. Furthermore, a structure formed in accordance with the present invention by cold pressing and then sintering was found to have a flexural strength of approximately 23,000 psi (1565.2 atmospheres). The latter value is 21 times that of similar $BaSO_4$ structures, which has a flexural strength of about 600 psi (40.8 atmospheres).

TABLE I
REFLECTANCE DATA

| Item | Sample Description | Diffuse Reflectance* |
|---|---|---|
| 1 | Reference Standard - $BaSO_4$ Eastman - 6091 Average particle size = 1.5 ± 0.5 microns Injection molded | |
| | Sintered at 1050° C. | 97% |
| | Sintered at 900° C. | 98.8% |
| 2 | Aluminum oxide, 99.7% pure (A973 Grade from R&W products) Average particle size = 4–5 microns Cold pressed Sintered at 1700–1710° C. | 94.3% |
| 3 | Aluminum oxide, 99.7% pure (Ceralox from Parmatech Inc.) Average particle size = 4–5 microns Cold pressed Sintered at 1700–1710° C. | 94.0% |
| 4 | Present invention Aluminum oxide (ALCOA 16SG grade) Average particle size = 0.45 microns Injection molded Sintered at 1400° C. for 1 hour | 96.8% |

*At 700 nanometers

EXAMPLE 1

Alcoa grade A-16SG aluminum oxide ($Al_2O_3$), average particle size 0.3 to 0.5 microns, was made into a slurry with 1,1,1,trichloroethane (solvent) containing 0.1 gram of paraffin wax per cubic centimeter of solvent. The volume of solvent was calculated to provide 3 weight percent (w/o) of paraffin wax in the $Al_2O_3$ when dry or free of solvent. The slurry was wet ball milled in the solvent until thoroughly mixed. The solvent was allowed to evaporate and the $Al_2O_3$ was cold pressed at 5,000 psi (340.2 atmospheres) pressure into disks measuring 1.13 inches in diameter and 0.140 inch thick. The disks were calcined or heat treated to 1400° C. for 60 minutes. The final density of parts were 84% of theoretical. The diffuse reflectance of the disks were measured in an integrating sphere spectrophotometer at 700 nanometer wavelength. The diffuse reflectance was found to be 101% of the Eastman Kodak standard BaSO$_4$ (Catalogue #6091, batch #502-1).

EXAMPLE 2

Alcoa grade A-16SG Al$_2$O$_3$ (0.3 to 0.5 microns particles) was mixed with an appropriate amount of magnesium oxide (MgO) (grain growth inhibitor) to provide an MgO content of 700 ppm. The Al$_2$O$_3$ . 0.07 w/o MgO mixture was saturated with 3 w/o paraffin wax as in Example 1 above. The mix was placed in a rubber boot and cold isostatically pressed at 30,000 psi (2041.5 atmospheres). Parts were machined to the geometry shown in FIG. 1. The parts were heat treated at 1425° C. for 60 minutes. The final density was 78% of theoretical. Diffuse reflectance measurements were made as in Example 1 above and the reflectance was 100% of the BaSO$_4$ standard.

EXAMPLE 3

Alcoa grade—ALUMULUX-39 (a high purity grade Al$_2$O$_3$—99.9%) average particle size 0.3 to 0.5 microns was mixed with the following materials shown as follows:

|   |   | Weight Percent |
|---|---|---|
| A | ALUMULUX 39 - Al$_2$O$_3$ | 85.0 |
| B | Polystyrene | 6.0 |
| C | Polyethylene | 0.75 |
| D | Wesson Oil | 6.0 |
| E | Stearic Acid | 2.25 |

The above mix was injection molded at 5,000 psi (340.2 atmospheres) and 170° C. into a die having the geometry of FIG. 2. The plasticizers were removed with ethyl alcohol and the polystyrene was removed with 1,1,1,trichloroethane.

The parts were heat treated for one hour at 1400° C. Final density was 78% of theoretical. Reflectance measurements were made as in Example 1 and found to be 100.2% of the BaSO$_4$ standard.

EXAMPLE 4

Aluminum oxide disks (0.9 inch (2.29 cm) in diameter×0.12 inch (0.30 cm) thick) fabricated by the processes described in Example 1 were selected for evaluating the samarium glaze. Calculations were made based on the density of the samarium glaze (3.2 grams per cubic centimeter) and the surface area of the Al$_2$O$_3$ disks to provide the weight of samarium oxide frit (powdered glass) to yield samarium glaze thicknesses on the Al$_2$O$_3$ disks of 0.001 inch (0.025 millimeter), 0.003 inch (0.076 millimeter), 0.005 inch (0.127 millimeter), 0.007 inch (0.178 millimeter) and 0.009 inch (0.229 millimeter). The calculated weight of samarium frit was placed in the center of each disk. The Al$_2$O$_3$ disks with frit were placed in a furnace and heated to 1300° C. for 60 minute time periods. The frit melted, flowed over the top surface of the disks providing a uniform thickness glaze which was very smooth and transparent to the visible light spectrum. Subsequent tests of this glaze indicated an extremely strong bond to the Al$_2$O$_3$ substrate by virtue of the nominal 15% porosity of the substrate. Furthermore the very smooth nature of the glaze provided a surface which did not collect dirt or debris and could be wiped clean just like a glass window. Absorption measurements were made on all five disks (0.001 to 0.009 inch or 0.0254 to 0.229 millimeter thicknesses) in an integrating sphere spectrophotometer from 220 nanometers to 2400 nanometers. Absorption was found at precisely 1.06 microns. There was zero absorption for a BaSO$_4$ standard and an uncoated (no-glaze) Al$_2$O$_3$ disk. The absorption for the 0.001 inch thick glaze was significant and progressed in textbook fashion as the thickness increased from 0.001 inch (0.025 millimeter), 0.003 inch (0.076 millimeter), 0.005 inch (0.127 millimeter), 0.007 inch (0.178 millimeter) and 0.009 inch (0.229 millimeter).

The five disks exhibited very low absorption from 520 to 800 nanometers. The glaze did absorb in the ultraviolet regions (350 nm) which is desirable in certain laser systems. Accordingly, the glaze performs several desired functions as just described.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A ceramic structure for use as a laser pump cavity to surround a rod of laser material and a light source emitting radiation within a range of 0.4 to 2.0 microns, and wherein laser radiation at a lasing wavelength is produced by said laser material upon exposure to said light source, said ceramic structure comprising a ceramic body having an interior surface defining said pump cavity wherein said ceramic body comprises sintered alumina having grain sizes of between about 0.3 to 0.5 microns and a packing density between about 70 to 87 percent such that said grain size and said packing density provide optimum diffuse reflectance of said radiation within said pump cavity.

2. A ceramic structure according to claim 1 wherein said ceramic body is adapted for use in a Nd:YAG laser.

3. A ceramic structure according to claim 2 wherein said grain sizes are approximately 0.45 microns.

4. A ceramic structure according to claim 1 wherein said ceramic body is adapted for use in a Nd-doped gadolinium scandium gallium garnet laser.

5. A ceramic structure according to claim 1 which further includes on said interior surface a coating of a glaze which absorbs radiation at said lasing wavelength.

6. A ceramic structure according to claim 5 wherein said glaze comprises samarium oxide.

7. A ceramic structure according to claim 1 wherein said packing density is about 85 percent.

8. A laser pumping device comprising:
a rod of laser material, a light source optically coupled to said rod for emitting pumping radiation within the range of 0.4 to 2.0 microns to establish population inversion in said laser material between a pair of energy levels having an energy difference therebetween such that said rod emits laser radiation at a lasing wavelength corresponding to said energy difference between said energy levels; and
a ceramic structure surrounding said rod and said light source, said ceramic structure comprising a ceramic body comprising sintered alumina having grain sizes of between about 0.3 to 0.5 microns and a packing density between about 70 to 87 percent to thereby optimize the diffuse reflectance of said pumping radiation.

9. A laser pumping device according to claim 8 wherein said laser material is selected from Nd:YAG and Nd:GSGG.

10. A laser pumping device according to claim 8 wherein said grain sizes are approximately 0.45 microns.

11. A laser pumping device according to claim 8 wherein said ceramic body includes an interior surface defining a pump cavity surrounding said rod and said light source, said ceramic structure further including a coating of a glaze containing samarium oxide on said interior surface.

12. A ceramic structure for use as a laser pump cavity to surround a rod of laser material and a light source emitting radiation within a range of 0.4 to 2.0 microns and wherein laser radiation at a lasing wavelength is produced by said laser material upon exposure to said light source, the improvement comprising said structure being made by sintering alumina powder at a temperature of about 1400° C for 0.8 to 4 hours to form a sintered alumina ceramic body having grain sizes of between about 0.3 to 0.5 microns and a packing density between about 70 to 87 percent, thereby producing a diffuse reflectance within said pump cavity and a packing density between about 70 to 87 percent.

13. A method for optimizing reflectance of radiation within a laser pump cavity, said radiation having a range of 0.4 to 2.0 microns comprising placing said light source and said laser rod within said pump cavity comprising sintered alumina having grain sizes of between 0.3 to 0.5 microns and a packing density between about 70 to 87 percent whereby said alumina optimizes said reflectance of said radiation.

* * * * *